United States Patent [19]

Seemann, III

[11] Patent Number: 4,902,215

[45] Date of Patent: Feb. 20, 1990

[54] PLASTIC TRANSFER MOLDING TECHNIQUES FOR THE PRODUCTION OF FIBER REINFORCED PLASTIC STRUCTURES

[76] Inventor: William H. Seemann, III, 26 Montacilla, Ocean Springs, Miss. 39564

[21] Appl. No.: 333,747

[22] Filed: Mar. 30, 1989

Related U.S. Application Data

[63] Continuation of Ser. No. 203,806, Jun. 8, 1988, abandoned.

[51] Int. Cl.$^4$ .................... B29C 43/02; B29C 43/20; B29C 43/18
[52] U.S. Cl. ........................... 425/406; 156/382; 156/500; 425/389; 425/405.1
[58] Field of Search ............... 264/101, 102, 136, 137, 264/258, 313, 324, 511, 512, 510; 156/87, 286, 382, 500; 425/405.1, 406, 388, 389

[56] References Cited

U.S. PATENT DOCUMENTS

| | | | |
|---|---|---|---|
| 2,913,036 | 11/1959 | Smith | 264/102 |
| 2,977,269 | 3/1961 | Nerwick | 264/102 |
| 3,055,058 | 9/1962 | van Hartesvelot | 264/102 |
| 3,553,054 | 1/1971 | Maus | 156/286 |
| 3,575,756 | 4/1971 | Maus | 156/382 |
| 3,775,214 | 11/1973 | Winters | 264/102 |
| 3,962,394 | 6/1976 | Hall | 264/313 |
| 4,062,917 | 12/1977 | Hill et al. | 264/102 |
| 4,132,755 | 1/1979 | Johnson | 264/102 |
| 4,311,661 | 1/1982 | Palmer | 264/102 |
| 4,313,029 | 1/1982 | Fourcher | 264/101 |
| 4,562,033 | 12/1985 | Johnson et al. | 264/510 |
| 4,620,890 | 11/1986 | Myers et al. | 264/313 |
| 4,622,091 | 11/1986 | Letterman | 156/87 |
| 4,759,893 | 7/1988 | Krauter | 264/258 |
| 4,780,262 | 10/1988 | VonVolkli | 264/101 |
| 4,816,106 | 3/1989 | Turris et al. | 264/102 |
| 5,676,857 | 6/1987 | Lerma | 264/510 |

FOREIGN PATENT DOCUMENTS

| | | | |
|---|---|---|---|
| 60-83826 | 5/1985 | Japan | 264/101 |
| 944955 | 12/1963 | United Kingdom . | |
| 1082908 | 9/1967 | United Kingdom | 264/102 |

Primary Examiner—Willard Hoag
Attorney, Agent, or Firm—Llewellyn A. Proctor

[57] ABSTRACT

A process, and apparatus for the production of fiber reinforced plastic structures, particularly high strength fiber reinforced plastic structures via an improved vacuum assisted technique. In apparatus which includes a fluid impervious outer sheet, or bag, provided with a resin inlet, marginally sealed upon a mold to provide a chamber in which can be place a fiber lay up and which in turn is provided with a vacuum outlet there is provided a resin distribution medium for location on one side of the fiber lay up of character which permits on application of a vacuum the ready, continuous flow of resin via the resin inlet into the chamber to the marginal edges of said resin distribution medium. Closure of the outer sheet, or bag, with the fiber lay up is prevented by the presence of the resin distribution medium while the flow of resin is continued throughout the resin distribution medium, the resin applied to one side of the fiber lay up, and the resin cured. The fiber reinforced plastic structure is removed from the mold after the resin has cured by peeling away the outer sheet, or bag, and resin distribution medium. The strength of the fiber reinforced plastic structures, and fiber reinforcement-to-plastic ratios are of quality and strength approximating structures made by the more complex prepreg-autoclave processes.

14 Claims, 6 Drawing Sheets

PLASTIC TRANSFER MOLDING TECHNIQUES FOR THE PRODUCTION OF FIBER REINFORCED PLASTIC STRUCTURES

This application is a continuation of Ser. No. 203,806, filed June 8, 1988 and now abandoned.

FIELD OF THE INVENTION

This invention relates to improved transfer molding techniques for the construction of fiber reinforced plastic structures. In particular, it relates to improvements in apparatus for the production of fiber reinforced plastic structures, especially to an improved resin impregnation apparatus and resin distribution medium for such purpose.

BACKGROUND AND PROBLEMS

Fiber reinforced plastic structures have been commercially produced for some years, the processes for producing these structures requiring the incorporation of a reinforcing fiber, generally in the form of one or more layers of a woven or felted fiberglass, within a resin, or other fluent plastic material. This is generally done by either a wet or dry fiber lay up technique. In accordance with the former process, the resin "wetted" fiber reinforcement is laid up on a mold, and in the latter the fiber reinforcement is laid up dry on a mold, or form which serves as a mold (albeit the form may be incorporated as part and parcel of the finished product), and the fiber sprayed, brushed or otherwise coated or "wet" with the resin. The resin is then cured to form the fiber reinforced plastic structure.

Vacuum assisted, or vacuum bag techniques have been used in the past to form fiber reinforced plastic structures. In a vacuum bag technique, a flexible sheet, liner, or bag is used to cover a single cavity mold which contains the dry or wet fiber lay up. In accordance with the former, the edges of the flexible sheet are clamped against the mold to form an envelope and seal the member, a catalyzed liquid plastic or resin is generally introduced into the envelope, or bag interior, to wet the fiber, and a vacuum is applied to the bag interior via a vacuum line to collapse the flexible sheet against the fiber and surface of the mold, while the plastic wetted fiber is pressed and cured to form the fiber reinforced plastic structure. Resin fumes from the process are prevented from escaping into the ambient work space.

British Pat. No. 944,955 to Phillip Richard Green, published 12/18/63, describes a vacuum bag technique for the production of a fiber reinforced plastic structure. In accordance therewith, a plurality of layers of a dry glass fabric, or cloth, are laid upon a single cavity mold, the mold is covered by a flexible sheet, or bag, and the outer edges of the sheet are sealed upon the mold to leave an internal mold space in which the dry lay up is contained. A liquid resin is introduced via a supply line located at the top center of the bag to the bag interior, or mold space, to cover the dry lay up, and a vacuum is drawn upon the bag via a vacuum line located at a peripheral edge of the mold. The bag is collapsed against the mold, to press and force the fiber to follow its contour, and heat may be applied to cure the resin. The Patentee suggests the "In the case of some resin materials of high viscosity, it may be necessary to assist the flow of resin through the mold space by applying a suitable squeegee or roller to the outside of the bag." In producing satisfactory fiber reinforced plastic structures, particularly structures of maximum strength, it is recognized that islands formed by either too much or too little plastic, especially dry sports, must be avoided. All of the fiber should be wetted by the plastic, but such laminate should contain only sufficient resin to bond the fibers. The finished fiber reinforced plastic structure must be homogenous.

In U.S. Pat. No. 4,312,829, which issued to Frederic J. Fourcher on 01/26/82, there is also described a mold section and a second (upper) flexible mold section, the edges of the flexible mold section of which are sealed and supported upon the rigid mold section to leave an internal chamber. The upper side of the flexible mold section is provided with an inlet through which a resin can be introduced to the chamber, and a vacuum outlet for pulling a vacuum upon the chamber. A perforated core material is placed within the chamber to which the resin is introduced, and on which the resin is set for formation of a resin-core structure. A matting can be placed atop the core to prevent escape of resin into the vacuum outlet. After the plastic has set, the flexible, or upper mold is removed.

U.S. Pat. No. 2,913,036, issued on 11/17/59 to George H. Smith, describes a vacuum bag method wherein a rigid network of veins or arteries are extended upwardly from the base of the mold. The purpose of the veins or arteries is to flow the plastic, or resin, upwardly through the mold surface to apply at a multiplicity of points a fluid plastic, or resin, which may then seep from the points to every part of the mold space. The veins or arteries are elongated, generally rigid members coated with a permeable material, or embedded between layers of the fabric reinforcing material to become an integral part of the final casting, appearing therein as reinforcing ribs. If the veins or arteries are not to be embedded in the final product, it is suggested by the Patentee that they be left uncovered or only lightly covered upon the outside of the fabric. Then, after the casting is hardened, the artery structure can be broken away from the finished fiber plastic structure, and discarded. If true, as suggested by the Patentee, that the resin can be distributed to provide "a good, void-free, homogenous laminate" the necessity of having to incorporate the network of veins or arteries in the fiber plastic structure can lessen or even destroy the value of many products. Or, the alternative, of having to break the veins and arteries free of the finished fiber plastic structure is extremely burdensome, and can injure the surface characteristics of the product. Moreover, albeit better distribution of the resin may be possible than conventional at the time, the fact that the resin introduced into the vacuum bag must be drawn straight up against gravity, and then vertically and radially against gravity within the reticulated structure, leaves much to be desired in terms of producing a structure in which the distribution of resin is entirely and consistently uniform.

In U.S. Pat. No. 4,132,755 which issued on 01/02/79 to Jay Johnson there is disclosed a "bag within a bag" vacuum bag technique for obtaining better and more uniform distribution of the resin. In accordance therewith a perforated flexible sheet is placed over the dry fiber lay up within the inner chamber is a single cavity mold, and the inner chamber is connected to a vacuum source. An impervious flexible sheet is placed over the perforated flexible sheet to provide an outer chamber between the two sheets, the outer chamber is connected to a resin source, and the edges of both sheets are sealed upon the mold surface. In accordance with this method better distribution of the resin throughout the mold space is obtained than with that of Smith because, in the words of the Patentee, "the resin, instead of flowing longitudinally through the glass fibers and giving a 'washing' effect which orients these fibers is evenly distributed through the many pinhole-like apertures in the perforated sheet. In this manner each drop of resin reaches every corner of the laminate without flowing lengthwise through the glass reinforcement." Albeit it can be said that Johnson's "bag within a bag" technique may provide more uniform distribution of the resin, and provides better resin-to-reinforcement ratios, this technique to is not without its limitations which appear to severely restrict its use. It has thus been found, e.g., that the paths of distribution of the resin across the upper surface of the impervious flexible sheet within the outer chamber results in considerable channeling, is considerably lacking in establishing a uniform network of flow paths, and flow through many of the pinhole-like apertures is far from uniform. Often large areas of the inside face of the impervious sheet collapses against the outer face of the perforated sheet and the flow of resin through these areas greatly restricted, or as most often happens interrupted altogether. Whereas massaging the surfaces from the outside, as suggested by Johnson, can sometimes help in alleviating this condition by reinitiating or increasing the rate of flow of resin through these areas, constant attention by an operative is required. Without this type of constant assistance, it is not possible to operate on a continuous basis. Thus, there remains a pressing need for a process, or apparatus, or both, for adequately uniformly distributing resin to a fiber lay up as is required for constructing superior, or even acceptable fiber reinforced plastic structures. There also is a pressing need for a process, and apparatus, of this type which will require minimum use of operating labor.

OBJECTS

It is, accordingly, the primary objective of this invention to meet these and other needs.

A particular object is to provide an improved apparatus, for the production of high strength fiber reinforced plastic structures, particularly fiber reinforced plastic structures having high reinforcement-to-resin ratios.

A further object is to provide an apparatus for the production of said fiber reinforced plastic structures, particularly fiber reinforced plastic structures of a variety of sizes and shapes—ranging from flat to highly contoured, and orientation ranging from that wherein the fluid plastic or resin is applied downwardly with gravity assist or upwardly at angles ranging from maximum to zero gravity assist—wherein the fluid plastic, or resin is more uniformly, consistently and continuously applied to the fiber reinforcing material with minimal use of operating labor.

A further, and more specific object, is to provide apparatus for more uniformly, consistently and continuously applying the fluid plastic, or resin to one or more layers of woven or felted reinforcing materials, particularly woven or felted fiberglass, to form fiberglass reinforced laminates of strength favorably comparable to laminates of substantially similar composition formed by prepreg-autoclave techniques.

Yet another object is to provide apparatus for forming high strength fiber reinforced plastic sandwich structures.

THE INVENTION

These objects and others are achieved in accordance with this invention embodying improvements in resin transfer molding techniques, or apparatus which includes (1) a fluid impervious outer sheet, suitably rigid but preferably a fluid impervious flexible or semi-flexible outer sheet, (2) an inlet in said fluid impervious outer sheet through which a resin, generally a catalyzed resin, can be introduced, (3) a mold surface upon which one or more layers of a woven or felted fiber, or fabric can be laid, and over which said fluid impervious outer sheet can be laid and its marginal edges sealed to form a chamber within which said layer or layers of woven or felted fiber, or fabric is enclosed, and (4) a vacuum outlet to said chamber for drawing a vacuum upon said chamber to provide a driving force to assist flow of the resin, and collapse said fluid impervious outer sheet upon the mold surface and press said layer or layers of fiber, or fabric, while resin is introduced via said resin inlet to said chamber. The apparatus of this invention, in addition to the combination of features (1), (2), (3) and (4), further includes (5) a resin distribution medium, constituted of spaced-apart strands, or lines, running crisscross one with another, and an open array of separated raised segments providing vertically oriented spaced-apart props, or pillars, and spaced lateral openings between said props, or pillars, which provides a vast array of locations which support the fluid impervious outer sheet and, at these locations, prevent direct contact (or closure) between said outer sheet and the outer surface of sad layer or layers of fabric, while the resin introduced in the chamber flows through the lateral openings of the distribution medium to the outer edges thereof for distribution upon or to the outer face of said layer or layers of fabric which become readily uniformly impregnated with the resin when a vacuum is applied, and resin is introduced via the resin inlet to the chamber.

The strands, or lines of the resin distribution medium are preferably constituted of plastic monofilaments which are non-resin absorptive. In one form, the lines of the resin distribution medium are spaced apart and cross at right angles one to another, and beads, posts, or pillars of substantially uniform dimensions are located on a side of the structure where the lines cross. The resin distribution in another of its forms is one wherein the lines are of sufficient thickness that they form insectering slats which act as pillars between which lateral openings are provided to act as conduits for transport of the resin. In another of its forms, the resin distribution can be constructed as a knitted, or woven fabric, separated segments of which are raised to form pillars, or rows of pillars, and spaces therebetween forming lateral channels through which resin can flow freely when the resin distribution medium is in place separating the outer impervious sheet and the lay up of fiber, or fabric, supported on the mold surface.

In all embodiments, the resin distribution medium prevents closure between the inner face of said impervious outer flexible or semi-flexible sheet and upper surface of the fabric. Due to its open pillar-like structure, and the continuous network of lateral openings lying between these pillars, a continuous network of passageways in all directions is provided from the point of entry of the resin, or fluid plastic, over the whole area of the distribution medium. Consequently, when a vacuum is drawn upon the mold, resin introduced, and the impervious outer sheet is collapsed inwardly upon the fibrous material, or mold surface, the resin introduced into the mold will flow quite rapidly, continuously and without interruption via the network of passageways from the point of entry, or resin inlet, to the outer marginal edges of the distribution medium, and then vertically descend into the mold space over substantially the entire area of the distribution medium through the fabric lying thereunder to virtually completely saturate the one or more layers of fabric with the resin. The fabric lay up on the mold is substantially uniformly wetted by the fluid plastic, or resin, and the resin distribution medium is simultaneously tightly pressed by the collapsed impervious outer sheet, and the former directly pressed against the upper face of the fabric, while the resin is cured to form the fiber reinforced plastic structure.

A feature of this invention is that once the vacuum is applied, and a flow of catalyzed resin to the mold is initiated, no labor is required for operation of the process until after the fiber reinforced plastic structure has been formed, and cured. Thus, a vacuum is pulled on the mold, e.g., 14.7 psig, and the laminate is held in fixed position against the mold surface while resin is passed therethrough without "washing", or escape of fibers from the fiberous lay up; as occurs in many prior art techniques. The amount of resin retained within the plastic structure can be readily controlled, or varied as desired, with minimal waste, or loss of resin to slop as often occurs in prior art processes; and the amount of resin utilized can be readily controlled to provide essentially only enough resin to bond the fibers to produce a resin reinforced plastic structure having the strength of structures of generally similar composition formed by costly prepreg-autoclave processes. The fiber reinforced plastic structures can be formed, and cured, with "hands off" by an operative after pulling a vacuum and initiating the flow of resin to the mold, without regard to the orientation of the mold assembly—e.g., horizontal, vertical or an in-between angle of mold orientation—or mold shape. No squeeging or massaging of the outer sheet of the mold assembly is required in producing the fiber reinforced plastic structures of this invention.

Fiber reinforced plastic structures can be formed pursuant to the practice of this invention which have very high fiber reinforcement-to-resin ratios. For example, where fiberglass is employed as the fibrous reinforcing material, and an epoxy resin as the plastic bonding agent, fiberglass-plastic structures can be readily formed wherein the fiber:resin ration ranges from about 1:1 to about 5:1, and as is generally preferable from about 3:1 to about 5:1, based on the total weight of the fiberglass reinforced plastic structure. The structures having high fiberglass:resin ratios compare very favorably with structures made by the very costly prepreging-autoclaving processes, wherein a similar fiberglass and resin are employed. Other strength properties, i.e., tensile strength, flexural strength and modulus of elasticity, also compare favorably when the fiber reinforced structures of this invention are compared with similar structures made by a prepregging-autoclaving process.

The characteristics of a preferred apparatus, and process for its use, as well as its principle of operation, will be more fully understood by reference to the following detailed description, and to the attached drawings to which reference is made in the description. The various features and components in the drawings are referred to by numbers, similar features and components being represented in the different views by similar numbers. Subscripts are used in some instances with numbers where there are duplicate features and components, or to describe a sub-feature or component of a larger assembly.

Figure 1:
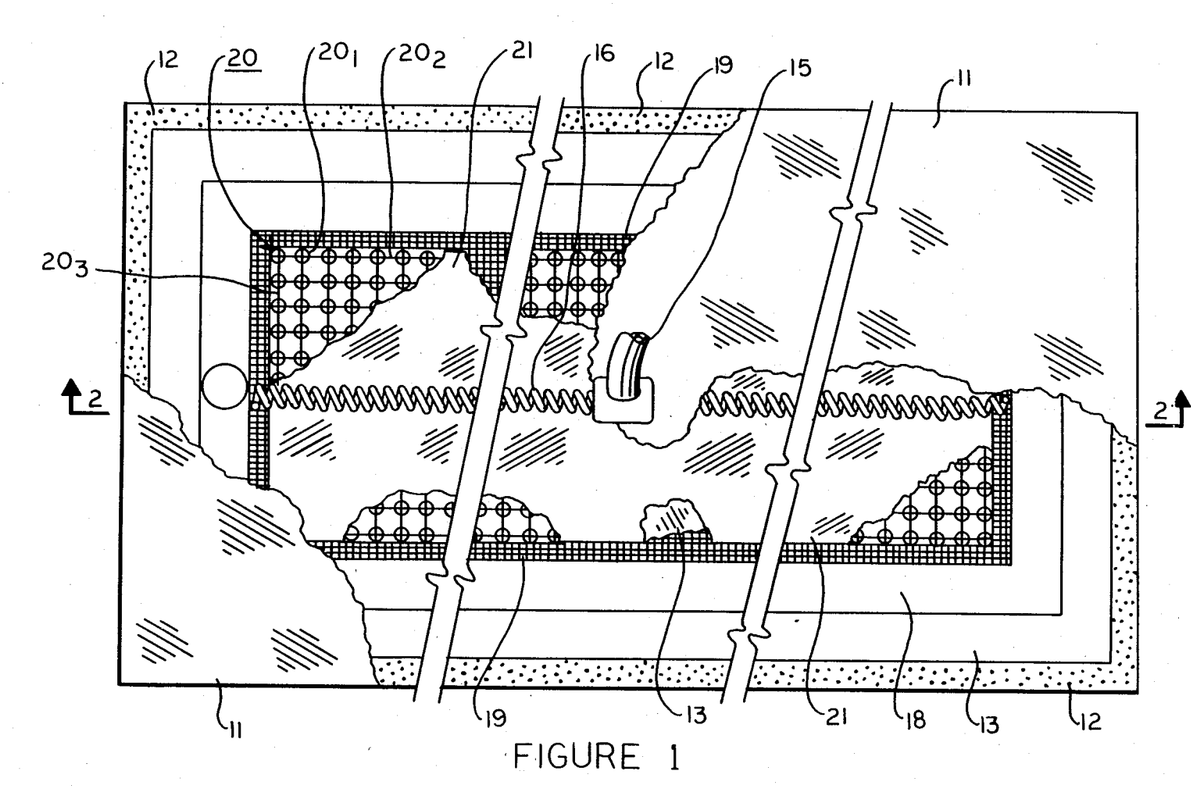
FIG. 1 depicts a plan view of a molding assembly of planar shape, the molding assembly including an impervious outer sheet provided with a resin inlet, a lower rigid mold surface complete with a vacuum outlet against which the marginal edges of said outer sheet are sealed to form an inner chamber, or mold space, a plurality of layers of a dry fiber reinforcing fabric the lower face of the bottom ply of which lies against the upper face of said rigid mold surface, and a resin distribution medium separated from the upper face of the top ply of the dry fabric lay up by an optionally supplied resin porous, peel ply.
Figure 2:
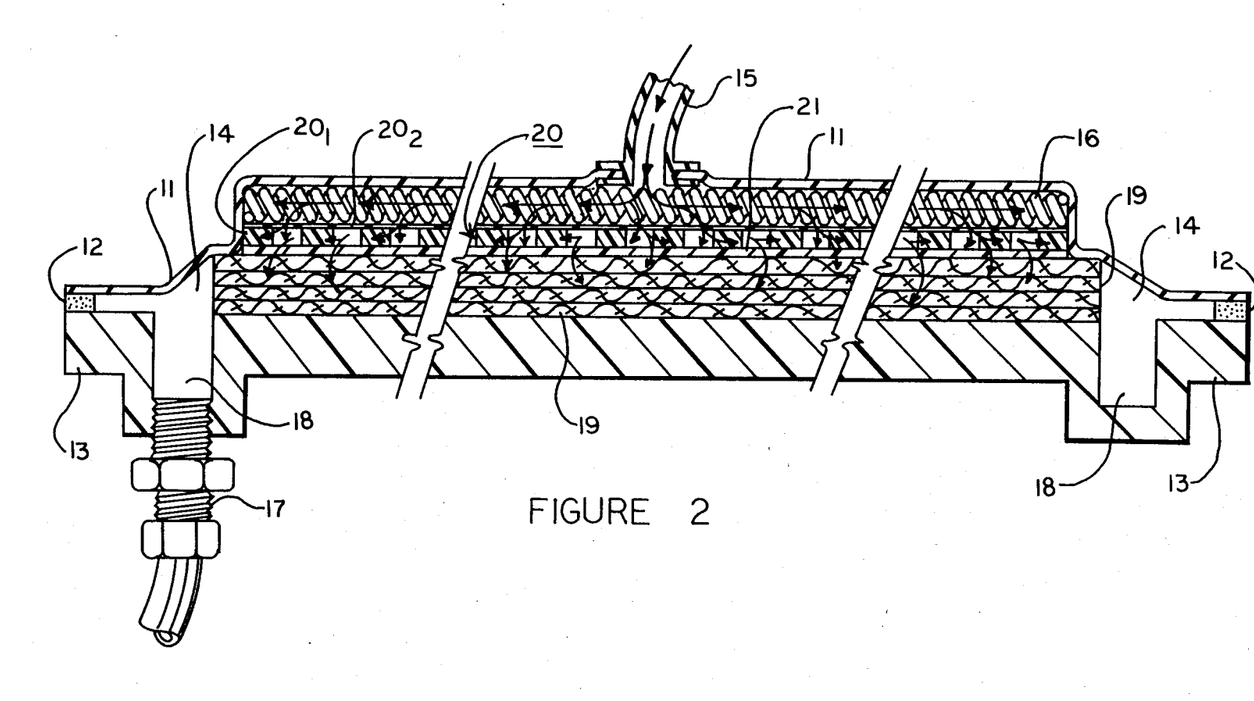
FIG. 2 is a section view taken through line 2—2 of FIG. 1.

Referring to the figures, first to FIGS. 1 and 2, there is shown a mold of planar design which has been found admirably suitable for the ready formation of fiber reinforced plastic structures of great strength, structures having physical qualities normally found in structures of corresponding fiber and resin composition molded and formed by a prepreg-autoclave process. In the mold set up, a fluid impervious outer sheet 11 is marginally sealed with tape 12 upon a rigid mold segment 13, the space between the inside face of the outer sheet 11 and upper face of the rigid mold segment 13 forming a chamber 14 (FIG. 2), or mold space. The outer sheet 11 is provided with a resin inlet 15, and optionally, but preferably a helical spring extension 16, through which a fluid plastic, or resin, suitably a catalyzed resin, can be supplied to the chamber 14, or mold space. The rigid mold segment 13 is provided with a vacuum outlet 17 (FIG. 2), or outlet through which the fluid, or gas contents of the chamber can be drawn or pumped to provide a vacuum. A continuous peripheral trough 18, located along the four edges and upper face of the rigid mold segment, facilitates application of the vacuum. A dry lay up of one or a plurality of layers of a fabric 19, or fabrics, is placed upon the upper face of the rigid mold segment 13 within the confines of the trough 18, and thereupon is placed a resin distribution medium 20 upon which resin is deposited when introduced via resin inlet 15 into the chamber 14. Optionally, a resin permeable peel ply 21, or release ply, is located between the lower face of the resin distribution medium 20 and the upper face of the top layer of fabric 19. In use, when suction is applied upon the mold via vacuum outlet 17 to draw a vacuum upon the mold interior, or mold cavity 14, and resin is introduced via resin inlet 15, the resin is dispersed from the point of initial introduction, in part through the helical spring 16, upon the resin distribution medium 20, via the channels therein to the outer edges of said resin distribution medium 20, the resin flowing vertically downwardly over the whole area of the distribution medium 20 to percolate through the layers of fabric 19. The impervious outer sheet 11, as a result of the applied vacuum, is pushed downwardly over its entire area against the distribution medium 20, and upper face of the rigid mold segment 13, and the layers of fabric thereby compressed against the face of the rigid mold segment 13. The resin supply to the resin inlet 15 is then cut off, and the resin impregnated fabric is cured.

After the resin has cured, the vacuum pulled upon the chamber 14 via vacuum inlet 17 is cut off, and the impervious outer sheet 11, distribution medium 20, and peel ply 21 are peeled from the flat, compact, fiber reinforced plastic structure. The purpose of the peel play 21 is to facilitate removal of the impervious outer sheet 11 and resin distribution member 20, and to leave upon the face of the flat, compact, fiber reinforced plastic structure from which these layers have been peeled a surface which is conditioned for the acceptance of a paint or other type of coating, if desired. Without the presence of the peel ply 21 the surface from which the impervious outer sheet 11 and resin distribution member 20 are removed is very smooth and must be shaded, or otherwise surface abraded if a paint or other type coating is to be applied.

The fluid plastic or resin entering the chamber 14 via the resin inlet 15, or helical spring 16—which is a direct extension of the resin inlet 15—flows continuously and without interruption via the open continuous network of passageways from the point of entry into the distribution medium 20 to the marginal edges of the resin distribution medium 20, thence downwardly through the peel ply 21, if present, through the one or more layers of reinforcing fabric 19, e.g., felted glass fibers or woven glass fabric. In contrast, but for the presence of the resin distribution medium 20, the resin entering the chamber via the resin inlet 15, even after many hours, and with the constant assistance of squeegeeing and massaging the outer surface of the impervious outer sheet 11 spreads only slowly outwardly from the point of entry over the surface of the reinforcing fabric 19, some of the resin penetrating the reinforcing fabric 19 leaving behind areas which are dry, or inadequately wetted by the resin. Channeling occurs, forming after curing, a fiber reinforced plastic structure having a relatively low reinforcing fiber-to-resin ratio, and overall nonuniform structure of generally low quality. Vacuum pressure is lost in areas where the resin seals. Furthermore, the vacuum on the laminate cannot be maintained in the areas between the outer edge of the resin advance and the resin inlet port, this resulting in a loss of pressure on the laminate and reduced fiber-resin ratios in these areas. This problem has been recognized but not solved until now. Johnson's earlier mentioned "bag within a bag" apparatus, and process, e.g., was an attempt to solve this problem, Johnson having formed an outer chamber constituted of an impervious outer sheet, provided with a resin inlet, and perforated inner sheet the marginal edges of both sheets of which were sealed upon a rigid mold half to provide between the lower face of the resin permeable inner sheet and upper face of the rigid mold half a contiguous inner chamber which contained the dry reinforcing fabric lay up upon which a vacuum was applied. The result intended was that the resin supplied to the outer chamber would spread uniformly outwardly over the entire upper face of the perforated sheet and pass downwardly through the perforations to the reinforcing fabric lay up. However, the reality is that even with the constant massaging and squeeging required to spread and distribute the resin, which makes the operation painfully slow, the resin is not uniformly distributed upon the reinforcing fiber lay up as a consequence of which the quality of the fiber reinforced fabric structures that are produced are of lesser quality than desirable. The resin, even with the constant massaging and squeegeeing is unevenly distributed because the impervious outer sheet and perforated inner sheet are collapsed one against the other causing channeling of the resin, and loss of vacuum. This leaves dry and inadequately wet areas as well as over-wet areas and generally poor and non-uniform distribution of resin. The resultant fiber reinforced plastic structure lacks uniformity, and leaves much to be desired in terms of strength, and reinforcing fiber-to-resin ratios.

Reference is again made to FIGS. 1-3, specifically to FIGS. 2 and 3, which show a preferred type of resin distribution medium 20 for use in the practice of this invention. The resin distribution medium 20, as well be observed, lies directly under and in direct contact with the impervious outer member, or sheet 11. It is constituted of an open network of non swelling, non resin absorptive monofilaments, a first set of spaced apart parallelly aligned monofilaments $20_2$ horizontally aligned one with respect to the other, and a second set of spaced apart parallelly aligned monofilaments $20_3$ vertically aligned one with respect to the other. The sets of monofilaments $20_2$, $20_3$, respectfully, are laid to intersect one set with the other at generally right angles, the points of contact being adhered one to the other to form a open mesh-like structure, or network, of contiguous parallelograms, or squares. At each of the intersections where the monofilaments $20_2$, $20_3$ cross, there is provided a bead, post, pillar or pillar-like member $20_1$ of substantially equal length the upper end of which is adhered to the lower face of the crossed monofilaments $20_2$, $20_3$, while the lower end thereof is projected substantially downwardly, or perpendicular to the plane formed by the open mesh structure. The cylindrical shaped posts $20_1$ are thus substantially equally spaced apart in any given direction, the upper ends of each pressing against the inner face of impervious outer sheet 11, while the lower terminal ends of each rest atop the optionally supplied peel ply 21 which lies across the upper face of the top ply of glass fabric When a vacuum is applied upon the composite structure, the outer impervious sheet 11 will be pressed down very tightly against the resin distribution medium 20, while supported by the posts $20_1$ to provide a continuous network of open passageways between the inner face of the outer impervious sheet 11 and upper face of the peel ply 21; or upper face of the top ply of fabric 19 if the peel ply 21 is not present. Consequently, a liquid plastic or resin introduced via the resin inlet 15, or resin inlet 15 and helical spring (previous conduit) 16, on application of a vacuum will readily pass downwardly through the upwardly faced openings of the resin distribution medium 20, and then flow laterally virtually without obstruction to the outer marginal edges of said resin distribution medium 20. Virtually the entire area of the resin distribution medium 20 between the posts $20_1$ will be filled with the liquid plastic, or resin, from where the resin will pass, or percolate, directly downwardly through the ply or plies of fabric 19 to substantially completely, uniformly "wet" the fabric 19. Once the vacuum is applied, and the flow of resin via line 15 to the system initiated, the resin will flow without interruption, and without any squeeging or massaging of the outer sheet 11 by an operative, into the resin distribution medium 20 to substantially completely uniformly impregnate the layer, or layers, of fabric 19 through-and-through with the resin. The applied vacuum constitutes the only driving force for the resin and, so long as it persists even though the vacuum pump is cut off, the resin will continue to flow without the aid or attendance of an operative. Whereas a pressure assist may also be applied to push the resin into the system this is generally unnecessary, and undesirable.

Figure 3:
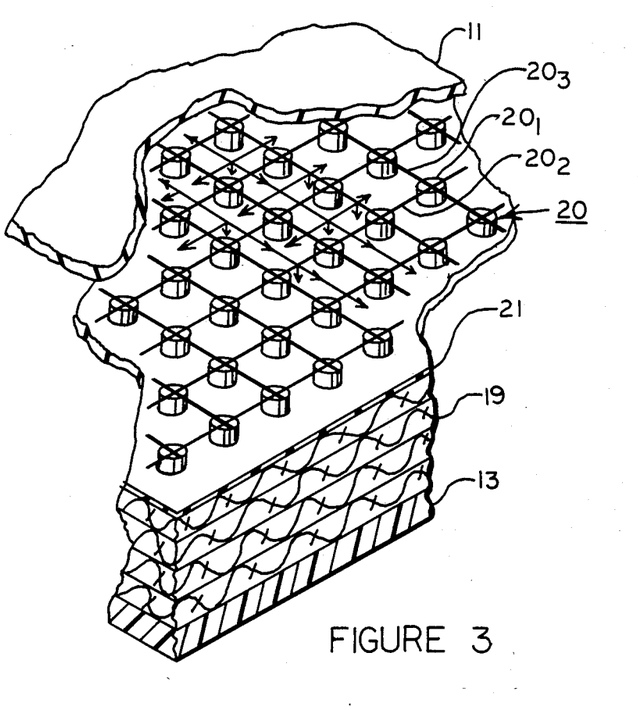
FIG. 3 depicts a close up isometric view, in partial section, of a segment of the molding assembly of FIGS. 1 and 2, showing particularly the resin distribution medium, as employed in the mold.
Figure 4:
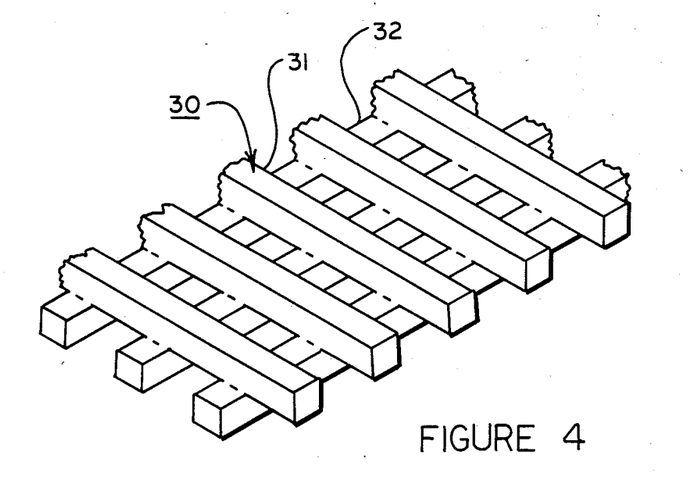
FIG. 4 depicts a second form of resin distribution medium per se; this resin distribution medium being also of a form preferred for use in the molding assembly depicted by reference to FIGS. 1 and 2.

A second form of the resin distribution medium is described by reference to FIG. 4. Referring to FIG. 4 there is shown a grid-like structure 30 constituted of two sets of spaced-apart parallelly aligned strips, a first set of strips 31 and a second set of strips 32 running at right angles with the first set of strips. The structure 30, substituted for structure 20 in the mold assembly described by reference to FIGS. 1-3, also provides an open network of pillar-like components for propping up and supporting the impervious outer sheet 11 at a level above the peel ply 21, or upper face of the top ply of fabric 19 if the peel ply 21 is not present, while simultaneously providing a network of continuous openings for the receipt of resin from a point of inlet, i.e., resin inlet 15, or resin inlet 15 and helical spring 16, and continuous lateral distribution of the resin from the point of inlet to the marginal edges of said resin distribution medium 30. Resin, on application of a vacuum, would thus flow downwardly from the point of inlet into the laterally aligned openings between upper strips 31, the upper surfaces of which would be in direct contact with the inside face of outer impervious sheet 11, into the upwardly vertically faced openings between strips 31, 32. From therein the resin would flow laterally between the parallel aligned channels between strips 32, the bottom faces of which rest upon peel ply 21 or the upper face of the top ply of fabric 19, to the marginal edges of said distribution medium 30. The resin, substantially uniformly distribution upon the upper face of the peel ply 21, or upper face of the top ply of fabric 19 of the peel ply were not present, would then percolate downwardly through the layer, or layers of fabric 19.

Figure 5:
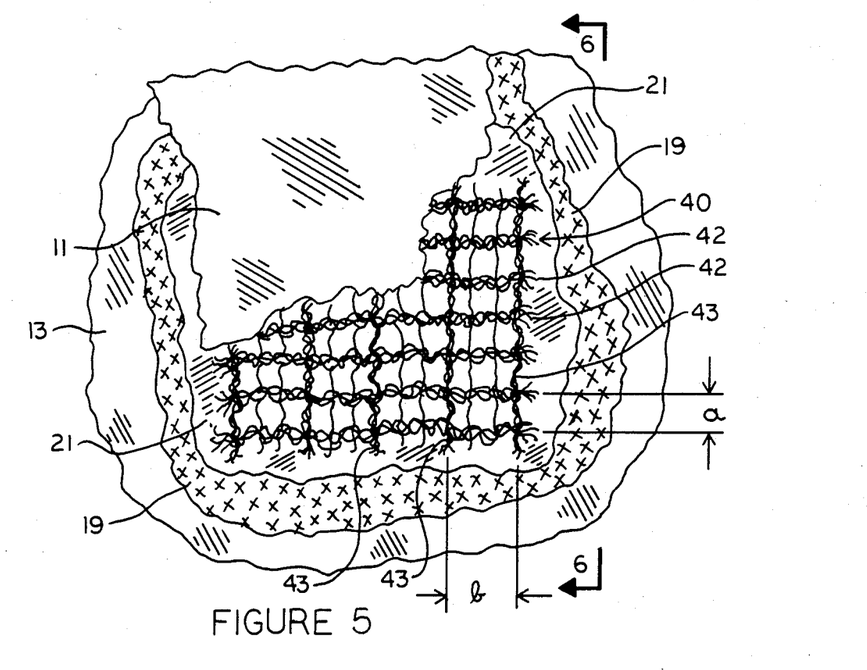
FIG. 5 depicts a third form of resin distribution medium and its relationship with other molding assembly components.
Figure 6:
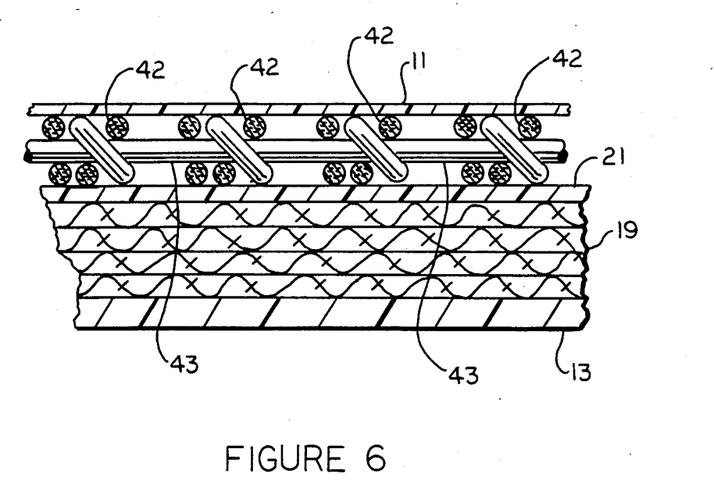
FIG. 6 is a section taken along lines 6—6 of FIG. 5, depicting a cross-section of the third form with other molding assembly components.

A third form of resin distribution medium 40 is depicted by reference to FIGS. 5 and 6. The resin distribution medium 40, a known article of commerce per se, has been employed highly successfully in the context of the mold assembly described by reference to FIGS. 1—3. The resin distribution medium 40 is constituted of a non swelling, non resin absorptive open weave fabric, knitted to provide network of close, adjoining or communicating openings, both in the vertical and lateral directions. The closely spaced vertically oriented filaments 42 act as pillars which prop the impervious outer sheet up, and maintain a space between the lower face of said outer sheet 11 and peel ply 21 (or the upper face of the top layer of fiber reinforcement, or fiber lay up 19 if the peel ply is not present), and simultaneously maintain a continuous network of connecting passageways through which the resin introduced into the resin distribution medium 40 can freely flow from the point of resin introduction to its marginal edges. Vertical support elements constituted of filaments 42, which are high built areas, act as pillars, or rows of pillars, spaced apart one from another, preferably substantially uniformly, at distances sufficient to leave from about 20 percent to about 90 percent, preferably from about 50 percent to about 90 percent, of open space between individual rows of supports. Thus, a row of supports formed by a cluster of monofilaments 42, separation between which in FIG. 5 is designated as "a", are separated one from another by a distance ranging from about 0.01 inch to about 0.50 inch, preferably from about 0.10 inch to about 0.40 inch. Each monofilament 42 is of average diameter ranging from about 0.01 inch to about 0.50 inch, preferably from about 0.10 inch to about 0.25 inch, providing an open space ranging from about 20 percent to about 90 percent, preferably from about 50 percent to about 90 percent, of the total cross-sectional area between adjacent rows of support. The clusters of monofilaments 43, which lie at right angles to the clusters of monofilaments 42, the distance between which is designated "b", are separated one row from another by a distance ranging from about 0.01 inch to about 0.50 inch, preferably from about 0.10 inch to about 0.25 inch. The open area included within the upwardly faced openings between the pairs of rows designated "a" and "b", respectively, ranges from about 20 percent to about 90 percent, preferably from about 50 percent to about 90 percent. The upwardly faced openings open directly into lateral channels formed between the pillars or rows of pillars 42, as a consequence of which resin introduced into the resin inlet 15, or resin inlet 15 and helical spring 16, will flow directly downwardly through the upwardly faced openings into the lateral channels which provide a continuous passageway for the flow of resin to the marginal edges of the resin distribution medium 40.

Figure 7:
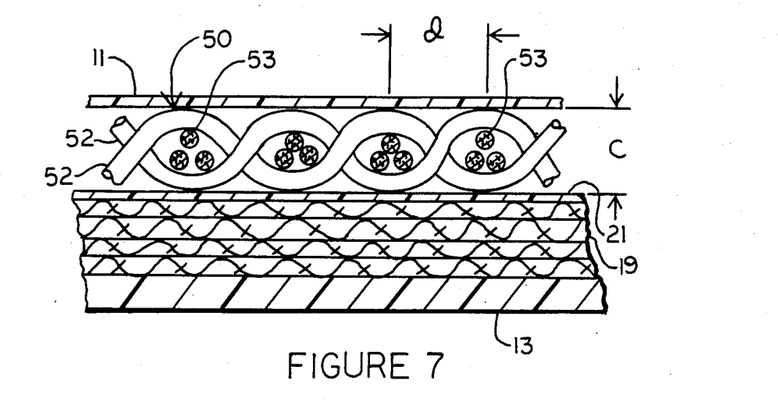
FIG. 7 depicts in cross-section a fourth form of resin distribution medium, and its relationship with other molding assembly components.

An open weave, woven fabric can also be employed as a resin distribution medium as depicted by reference to FIG. 7. Referring to FIG. 7, there is thus depicted a cross-section of a fourth form of resin distribution medium 50 which rests atop the peel ply 21 for support of the outer impervious sheet 11. The warp filaments, monofilaments or yarns 52 at their highest and lowest points of elevation, respectively, on passage over and under, respectively, the weft filament, monofilaments or yarns 53 form pillars which effectively hold the outer impervious sheet 11 up and out of contact with the peel ply 21, or upper face of the top ply of fabric 19 if the peel ply 21 were not present, and simultaneously provide connecting upward openings and lateral passageways by means of which resin can flow downwardly via the upwardly faced openings into the lateral passageways after distribution of resin upon the top of said resin distribution medium 50 via introduction thereupon of resin via resin inlet 15, or resin inlet 15 and helical spring 16. There average diameter of the filaments, monofilaments or yarns 52, 53 are generally such as to form a fabric having a thickness "c" ranging from about 0.01 inch to about 0.50 inch, preferably from about 0.10 inch to about 0.25 inch, a distance between peaks "d" ranging from about 0.01 inch to about 0.50 inch, preferably from about 0.10 inch to about 0.25 inch, and openings which collectively form from about 20 percent to about 90 percent, preferably from about 50 percent to about 90 percent, of the total area defined by "c" and "d".

Figure 8:
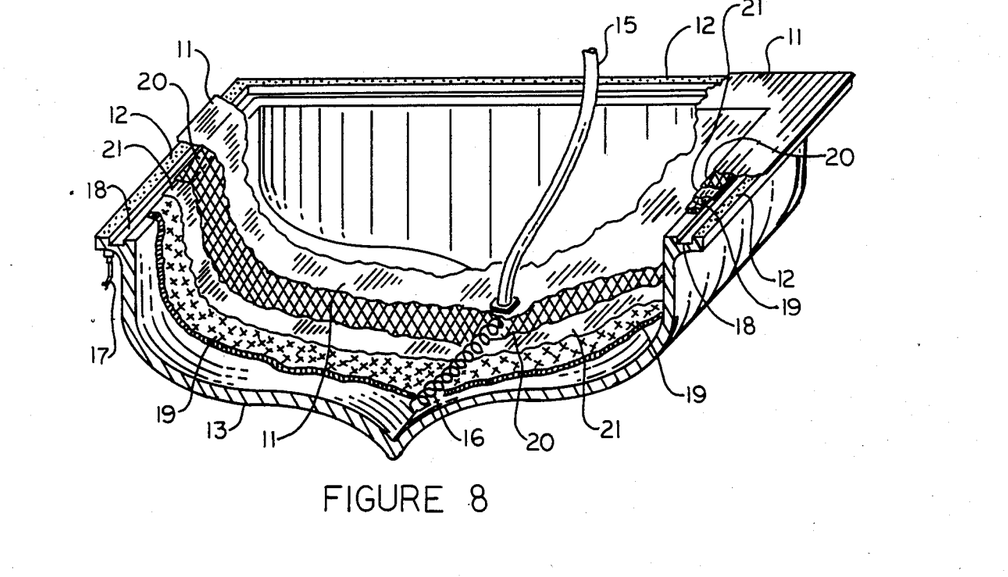
FIG. 8 depicts isometrically a molding assembly generally similar to that shown in FIGS. 1 and 2, except that in this instance a boat mold forms the lower rigid mold surface upon which the fiber reinforced plastic structure is shaped, and cured.

FIG. 8 depicts isometrically, and in partial section the rearward end of a mold assembly substantially the same as that described by reference to FIGS. 1–3, employing the same resin distribution medium 20, and associated mold components, but differs therefrom in that the impervious outer sheet 11, resin distribution medium 20, and peel ply 21 are sealed over a dry reinforcing fiber lay up support upon a rigid boat mold $13^1$, i.e., a mold which has the shape of a boat hull. The layers of fibrous reinforcing fabric 19 are layed upon the boat mold $13^1$ and covered from the stern to the bow (not shown) by the resin distribution medium 20. An outer fluid impervious sheet 11, to which resin inlet 15 is attached, encloses completely the reinforcing fiber lay up 19, and it is marginally sealed upon the boat mold $13^1$ via tape 12. A helical spring 16, which is located directly over the resin distribution medium 20 runs the length of the boat plug $13^1$. A resin inlet 15 is attached to the helical spring 16. A vacuum upon the chamber which is formed between the inner face of the impervious outer sheet 11 and upper face of the blat plug $13^1$. When a vacuum is applied, and resin is introduced via resin inlet 15 the resin will enter into the helical spring 16 and quickly flow via the helical spring 16 from one end of the boat plug $13^1$ to the other. Resin will then flow vertically downwardly from the helical spring 16 into the resin distribution medium 20, through the lateral distribution channels thereof to the very outer edges of the resin distribution medium 20, then through the peel ply 21 and into the reinforcing fiber lay up 19. From the low central part of mold $13^1$, resin will ascend through the lateral channels to the marginal edges of the resin distribution medium 20 to uniformly wet the upper surface of the peel ply 21 through which it will pass to uniformly impregnate through-and-through the dry fiber lay up 19. The flow of resin is substantially reduced at and beyond the edge of the distribution medium and proper placement of the distribution medium virtually eliminates flow of resin into the peripheral vacuum channel until the laminate is completely saturated with resin. Multiple layers of distribution medium may be used in some areas to facilitate resin flow to areas where the laminate is thicker and needs more resin. After curing, the resin impervious outer sheet 11, resin distribution medium 20 and peel ply 21, can be stripped or peeled away and the completed fiber reinforced plastic boat hull separated from within the boat plug $13^1$.

Figure 9:
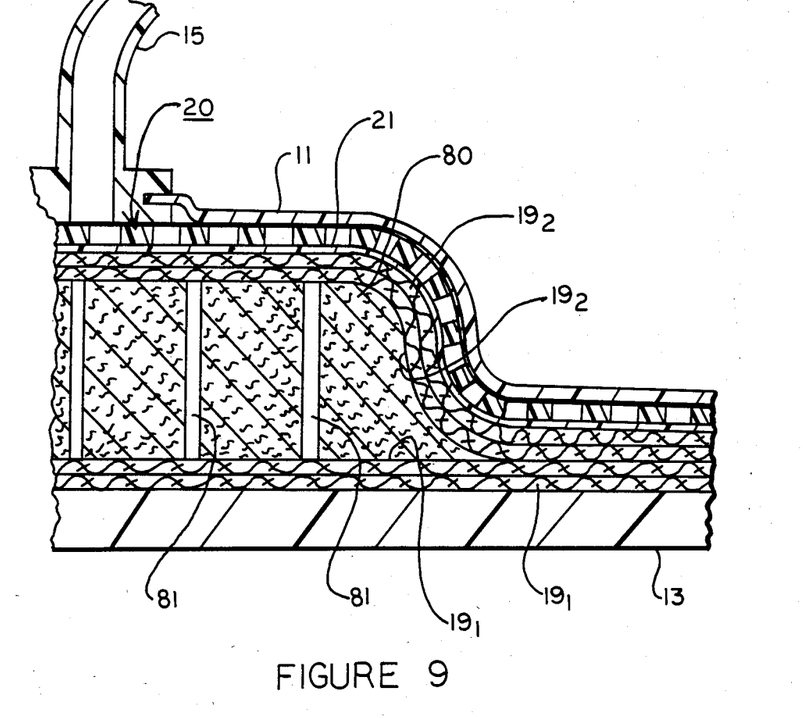
FIG. 9 depicts in cross-section a molding assembly as employed in the formation of a sandwich structure.

Reference is made to FIG. 9, showing in essence essentially the same mold assembly as described by reference to the preceeding FIGS. 1–3. The mold in this instance is employed to form a fiber reinforced plastic sandwich structure, or structure wherein a foam plastic is encapsulated, covered, surrounded, or sandwiched between sheets of fiber reinforced plastic; essentially as previously described. This figure shows, in a cross-section, a rigid mold segment 13, a first layer comprised of a plurality of plies of reinforcing fiber layers $19_1$ laid thereover, and on top of the fiber lay up a foam core 80, e.g., polyurethane, through which is drilled from top to bottom a plurality of spaced apart, vertically aligned openings, or holes 81 to which resin is supplied. A second layer comprised of a plurality of plies of reinforcing fiber $19_2$ is laid upon said first fiber layer $19_1$, the central portion thereof completely enclosing the foam core 80. A peel ply 21 is laid on top of the plies of reinforcing fiber $19_2$ and on top of the peel ply 21 there is placed a resin distribution medium 20. Finally, the entire lay up is covered by an impervious outer sheet 11, and the marginal edges of the plies are sealed by tape (not shown). The impervious outer sheet 11 is provided with a resin inlet 15, and a vacuum outlet (not shown) is provided for application of a vacuum upon the chamber containing the layers of reinforcing fibers $19_1$, $19_2$, and foam plastic core 80. Resin introduced via the resin inlet 15 into the chamber, after a vacuum is drawn is distributed via the resin distribution medium 20 throughout all of the layers of reinforcing fabric, upper and lower, resin also running vertically downwardly through the openings 81 of the foam core 80 after passage through the layers of reinforcing fibers $19_1$ to impregnate the fiber reinforcing fabric layers $19_1$ which lie beneath the openings. The vacuum pulls the layers tightly together and sufficient resin is supplied to uniformly impregnate and bond together the layers of reinforcing fibers $19_1$, $19_2$ to form on curing, and after removal of the outer impervious sheet 11, resin distribution medium 20, and peel ply 21, a sandwich structure having a high reinforcing fiber-to-resin ratio.

The following non-limiting examples are further illustrative of the invention.

EXAMPLES

A. A series of five ⅛ inch thick fiber glass reinforced vinyl resin panels (Samples 1–5) were made pursuant to the technique described by reference to FIGS. 1–3, utilizing 5 layers of plain weave fiber glass (24 oz. per sq. yd.) and on analysis (ASTM 790) were found to have the following characteristics, to wit:

| Sample Number | Flexural Strength psi | Modulus of Elasticity psi | Percent Resin By Weight psi |
|---|---|---|---|
| 1 | 128,000 | $3.69 \times 10^6$ | 25.7 |
| 2 | 132,000 | $3.65 \times 10^6$ | 25.6 |
| 3 | 122,000 | $3.86 \times 10^6$ | 26.2 |
| 4 | 108,000 | $3.50 \times 10^6$ | 26.4 |
| 5 | 123,000 | $3.39 \times 10^6$ | 25.8 |
| Avg. | 123,000 | $3.62 \times 10^6$ | 26.1 |
| Std. Deviation | 6,320 | $1.21 \times 10^5$ | 26.0 |

The reinforcing fiber-to-resin ratios of these very high strength materials compare favorably with panels of similar composition made by very costly prepreg-antoclave techniques, and contain essentially double the fiber-to-resin ratios made by known transfer molding techniques.

B. A thirteen foot long dinghy, with an 80 inch girth at its widest cross-section, of the same fiber glass-resin composition was formed by the technique described by reference to FIG. 8. The completed hull was 3/32 inch in thickness, and the material of which the hull was made appears of quality, and strength favorably comparable to the specimens described in "A".

C. The outer laminated panels, or skins, of a polyurethane foam core fiber glass reinforced epoxy resin sandwich structure, prepared as described by reference to FIG. 8, has been found, on careful inspection, to be of high strength, have a high reinforcing fiber-to-resin ratio, and are of composition substantially uniform throughout.

D. The test beams with a length of 10′, a width of 16″ and with a molded-in 6″ deep by 6″ wide hat section stiffener were formed by a combination of the technique described by reference to FIGS. 1–3 and FIG. 9. These beams were tested under expert supervision. The properties were judged to be of sufficient quality and strength for use in structures which previously only high pressure autoclave laminates had been considered acceptable. The lost savings by use of this process are very high.

The viscosities of resins which have been successfully employed in accordance with the invention described herein ranges from about 200 cps to about 1000 cps, and higher viscosity resins can be employed though the process cycle may be increased.

The techniques described herein are capable of some variations without departing the spirit and scope of this invention, as well be apparent to those of skill in this art.

Fiberous reinforcing materials per se are well known, and a numerous range of such materials can be used in accordance with this invention. Such materials include, e.g., glass, aramid, graphite boron fiber and the like. The same is true of resins and include, i.e., epoxy, polyester, vinylesters and the like.

Having described the invention what is claimed is:

1. In apparatus useful for the formation of fiber reinforced plastic structures wherein is included
   a fluid impervious outer sheet,
   a resin inlet in said fluid impervious outer sheet,
   a mold surface upon which can be supported a lay up of one or more layers of a fiberous material, and over which can be placed said fluid impervious outer sheet and its edges marginally sealed upon said mold surface to form a chamber, and
   a vacuum outlet for drawing a vacuum upon said chamber,
   the improved combination which further includes
   a resin distribution medium for location between said fabric lay up and said fluid impervious outer sheet constituted of spaced-apart lines running crisscross one with another, and an open array of separated raised segments on the surface of said the distribution medium which act as vertical pillars to prop apart the upper surface of said fabric layup and the lower face of said impervious outer sheet, to simultaneously maintain a network of connecting upwardly faced vertical openings and connecting lateral passageways through which resin introduced via the resin inlet into the resin distribution medium can flow freely from the point of resin introduction to the marginal edges of the resin distribution medium and thence downwardly over the entire area thereunder through the fabric lay up when vacuum is applied upon said chamber and said impervious outer sheet is collapsed upon the mold surface the resin inlet being contiguous with a pervious conduit disposed to function as a resin distribution means extending across said resin distribution medium.

2. The apparatus of claim 1 wherein the spaced-apart lines of the resin distribution medium which crisscross form two sets of lines parallel one with another and constituted of a non swelling, non-resin absorptive monofilament, and the raised segments are constituted of beads, knob-like projections or pillars located at the crossed intersections of the lines on a surface of the structure.

3. The apparatus of claim 1 wherein the spaced-apart lines of the resin distribution medium which crisscross form two sets of lines parallel one with another and constituted of a non swelling, non-resin absorptive slats of sufficient thickness to form parallel rows of pillars, and intersecting channels via which the resin can be transported throughout the resin distribution medium.

4. The apparatus of claim 1 wherein the resin distribution medium is in the form of a fabric knitted from a non-swelling, non-resin-absorptive monofilament, and the raised segments are provided by areas of increased bulk appearing as rows of separated pillars.

5. The apparatus of claim 1 wherein the resin distribution medium is in the form of a fabric woven from a non-swelling, non-resin absorptive monofilament, and the raised segments are provided by areas of increased bulk appearing as rows of separated pillars.

6. The apparatus of claim 1 wherein the fluid impervious outer sheet is flexible, or semi-flexible.

7. The apparatus of claim 1 wherein the combination further includes, between said resin distribution medium and the face of said lay up, a peal ply porous to resin which provides a peel surface for removal of the fluid impervious outer sheet, resin distribution medium and peel ply itself from the wetted, cured fiber reinforced plastic structure.

8. The apparatus of claim 1 wherein the resin distribution medium is constituted of a woven or knitted plastic monofilament, the vertical pillars aligned in straight rows, the rows are of thickness ranging from about 0.11 inch to about 0.25 inch, and the rows of pillars are separated one from another by a distance ranging from about 0.01 inch to about 0.50 inch.

9. The apparatus of claim 8 wherein the vertical pillars are aligned as a first set of spaced apart parallel straight rows, these first set of parallel straight rows are intersected at right angles by a second set of parallel straight rows which provide additional supporting pillars, the thickness of said second set of parallel straight rows ranging in thickness between about 0.01 inch and about 0.25 inch, and the rows forming said second set of parallel straight rows are separated one from another by a distance ranging from about 0.01 inch to about 0.50 inch.

10. The apparatus of claim 9 wherein the areas between adjacent pairs of said first and second sets of parallel rows provide upward openings ranging from about 25 percent to about 90 percent of the total area.

11. The apparatus of claim 1 wherein the mold surface is planar.

12. The apparatus of claim 1 wherein the mold surface is curved.

13. The apparatus of claim 1 wherein the mold surface defines a boat shape.

14. The apparatus of claim 1 wherein the resin inlet empties into a helical spring which acts to extend the resin inlet.

* * * * *